United States Patent
Krishnamurthy et al.

(10) Patent No.: US 8,300,757 B2
(45) Date of Patent: Oct. 30, 2012

(54) METHODS FOR DETECTION OF FAILURE AND RECOVERY IN A RADIO LINK

(75) Inventors: Sandeep Krishnamurthy, Mundelein, IL (US); Michael E. Buckley, Grayslake, IL (US); Ravi Kuchibhotla, Gurnee, IL (US); Robert Love, Barrington, IL (US); Ravi Nory, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 985 days.

(21) Appl. No.: 12/188,830

(22) Filed: Aug. 8, 2008

(65) Prior Publication Data

US 2010/0034092 A1  Feb. 11, 2010

(51) Int. Cl.
*H04L 7/00* (2006.01)
(52) U.S. Cl. .......... 375/357; 375/354; 375/356
(58) Field of Classification Search .......... 375/357, 375/354, 356; 455/356
See application file for complete search history.

(56) References Cited

U.S. PATENT DOCUMENTS

| | | | | |
|---|---|---|---|---|
| 5,815,538 | A * | 9/1998 | Grell et al. ............ | 375/356 |
| 6,782,066 | B1 * | 8/2004 | Nicholas et al. ....... | 375/368 |
| 2005/0120282 | A1 * | 6/2005 | Kim ..................... | 714/707 |
| 2008/0008212 | A1 | 1/2008 | Wang et al. | |
| 2008/0019279 | A1 | 1/2008 | Kim et al. | |
| 2008/0233963 | A1 | 9/2008 | Alanara et al. | |
| 2009/0011714 | A1 | 1/2009 | Hozumi | |
| 2010/0027456 | A1 | 2/2010 | Onggosanusi et al. | |
| 2010/0034092 | A1 | 2/2010 | Krishnamurthy et al. | |
| 2010/0113028 | A1 | 5/2010 | Simonsson et al. | |
| 2010/0265862 | A1 | 10/2010 | Choi et al. | |
| 2011/0011251 | A1 | 1/2011 | Truyman | |
| 2012/0108177 | A1 | 5/2012 | Miao et al. | |

FOREIGN PATENT DOCUMENTS

| | | |
|---|---|---|
| EP | 1768332 A2 | 3/2007 |
| EP | 1947812 A1 | 7/2008 |
| WO | 9823118 A1 | 5/1998 |
| WO | 0101610 A1 | 1/2001 |
| WO | 2007130324 A2 | 11/2007 |

OTHER PUBLICATIONS

International Search Report Mailed Nov. 25, 2009 in connection with related PCT Application No. PCT/US2009/050349.
Sandeep H. Krishnamurthy; Radio Link Synchronization in a Wireless Communication Device; U.S. Appl. No. 12/605,443, filed Oct. 26, 2009.
Sandeep H. Krishnamurthy; Radio Link Performance Prediction in Wireless Communication Terminal; U.S. Appl. No. 12/605,461, filed Oct. 26, 2009.
Lars Lindbom; LS on Indicating Radio Problem Detection; 3GPP TSG RAN WG1 Meeting #53; Kansas City, USA, May 2008.

(Continued)

*Primary Examiner* — Ted Wang
(74) *Attorney, Agent, or Firm* — Roland K. Bowler, II; Matthew C. Loppnow

(57) ABSTRACT

A method, telecommunication apparatus, and electronic device for detecting a status of a radio link are disclosed. A transceiver 302 may maintain a radio link with a network base station 104. A processor 304 may map channel state information to a synchronization status associated with the radio link based on the received signal and determine the synchronization status via a block error rate estimate in the radio link based on the channel state information.

27 Claims, 6 Drawing Sheets

OTHER PUBLICATIONS

Ericsson; Out of Synchronization Detection in E-UTRAN; 3GPP TSG-RAN WG4 Meeting #47bis; Munich, Germany; Jun. 2008.

Patent Cooperative Treaty "The International Search Report and the Written Opinion of the International Searching Authority" European Patent Office, Rijswijk, all pages, (PCT/US2009/062412, CS36516 dated May 28, 2010).

3GPP TSG-RAN WG4 Meeting #48bis; R4-082490; Edinburgh, Scotland, UK, Ericsson; "E-UTRA Out-of-Sync and In-Sync Requirements in DRX", 4 pages, dated Sep. 29, 2008-Oct. 3, 2008.

United States Patent and Trademark Office, "Non-Final Rejection" for U.S. Appl. No. 12/605,443 (CS36383) 12 pages, dated May 11, 2012.

Patent Cooperative Treaty "The International Search Report and The Written Opinion of the International Searching Authority", European Patent Office, Rijswijk, completed: all pages. (CS36516), (PCT/US2009/062812,dated Jun. 29, 2010).

Nokia: "Radio link problem detection", 3GPP Draft; R4-082439, 3rd Generation Partnership Project (3GPP), Mobile Competence Centre; 650, Routedes Lucioles; F-06921 Sophia-Antipolis Cedex; France, all pages, dated Sep. 29-Oct. 3, 2008.

Motorola: "Details on radio link failure and recovery in LTE", 3GPP Draft; R4-081998, 3rd Generation Partnership Project (3GPP), Mobile Competence Centre; 650, Route Des Lucioles; F-06921 Sophia-Antipolis Cedex; France, all pages, dated Aug. 18-22, 2008.

Robert Love et al.: "Phy 32-1—Downlink Control Channel Design for 3GPP LTE", Wireless Communications and Networking Conference, 2008, WCNC 2008, IEEE, IEEE, Piscataway, NJ, USA, p. 813-818, dated Mar. 21, 2008-Apr. 3, 2008.

3GPP TSG-RAN WG4 Meeting #49; "Radio Link Monitoring"; Prague, Czech Republic, R4-083333; 5 pages, dated Nov. 10-14, 2008.

Motorola: "EESM Link Error Prediction for EUTRA System Evaluation", 3GPP Draft; R1-050718_LTE_EESM, 3rd Generation Partnership Project(3GPP), Mobile Competence Centre; 650, Route Des Lucioles; F-06921 Sophia-Antipois Cedex; France, all pages, dated Aug. 9-Sep. 2, 2005.

3GPP TSG-RAN WG4 Meeting #48bis; Edinburgh, Scotland, UK, Radio Link Monitoring Requirements; R4-082657; 3 pages dated Sep. 29-Oct. 3, 2008.

3GPP TSG RAN WG4 Meeting #48bis; Edinburgh, Scotland, UK, Response LS on Indicating Radio Problem Detection; R4-082655; 2 pages dated Sep. 29-Oct. 3, 2008.

EESM for IEEE 802.16e: WiMaX; Seventh IEEE/ACIS International Conference on Computer Information Science; Mumatz et al., pp. 361-366, dated May 14-16, 2008.

Mutual Information Metrics for Fast Link Adaptation in IEEE 802.11n; Jensen et al., pp. 4910-4915 dated May 19-23, 2008.

United States Patent and Trademark Office, "Non-Final Office Action" for U.S. Appl. No. 12/605,461 (CS36516) 12 pages, dated Jul. 6, 2012.

* cited by examiner

100

400

METHODS FOR DETECTION OF FAILURE AND RECOVERY IN A RADIO LINK

FIELD OF THE INVENTION

The present invention relates to a method and system for maintaining a data link. The present invention further relates to determining if a data link is in synchronization.

INTRODUCTION

The Third Generation Partnership Project (3GPP) is developing a Long Term Evolution (LTE) carrier using a physical layer based on globally applicable evolved universal terrestrial radio access (E-UTRA). A user equipment (UE) device may use a cell-specific reference signal as a metric to determine if a radio link is in synchronization or out of synchronization by determining whether reliable transmission of physical downlink control channel (PDCCH) code word with specific formats can be supported in the link.

SUMMARY OF THE INVENTION

A method, telecommunication apparatus, and electronic device for detecting a status of a radio link are disclosed. A transceiver may maintain a radio link with a network base station. A processor may map channel state information to a synchronization status associated with the radio link based on the received signal and determine the synchronization status via a block error rate estimate in the radio link based on the channel state information.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, telecommunication apparatus, and electronic device for detecting a status of a radio link are disclosed. A transceiver may maintain a radio link with a network base station. A processor may map channel state information to a synchronization status associated with the radio link based on the received signal and determine the synchronization status via a block error rate estimate in the radio link based on the channel state information.

Figure 1:
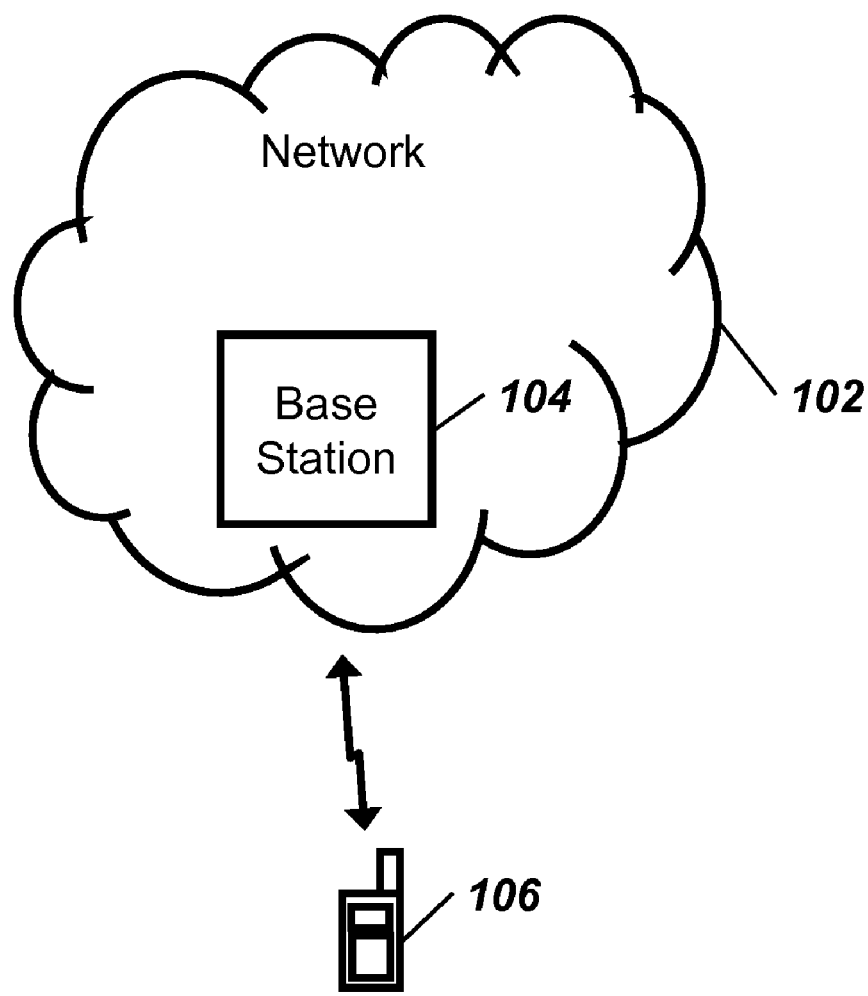
FIG. 1 illustrates one embodiment of a communication system.

FIG. 1 illustrates one embodiment of a communication system 100. The communication system 100 may include a network 102, base station 104, and user equipment (UE) 106. Various communication devices may exchange data or information through the network 102. The network 102 may be an evolved universal terrestrial radio access (E-UTRA), or other type of telecommunication network. A network entity, such as the base station 104, may assign a UE identifier (UEID) to the UE 106 when the UE 106 first joins the network 102. For one embodiment, the base station 104 may be a distributed set of servers in the network. The UE 106 may be one of several types of handheld or mobile devices, such as, a mobile phone, a laptop, or a personal digital assistant (PDA). For one embodiment, the UE 106 may be a WiFi® capable device, a WiMax® capable device, or other wireless devices.

Figure 2:
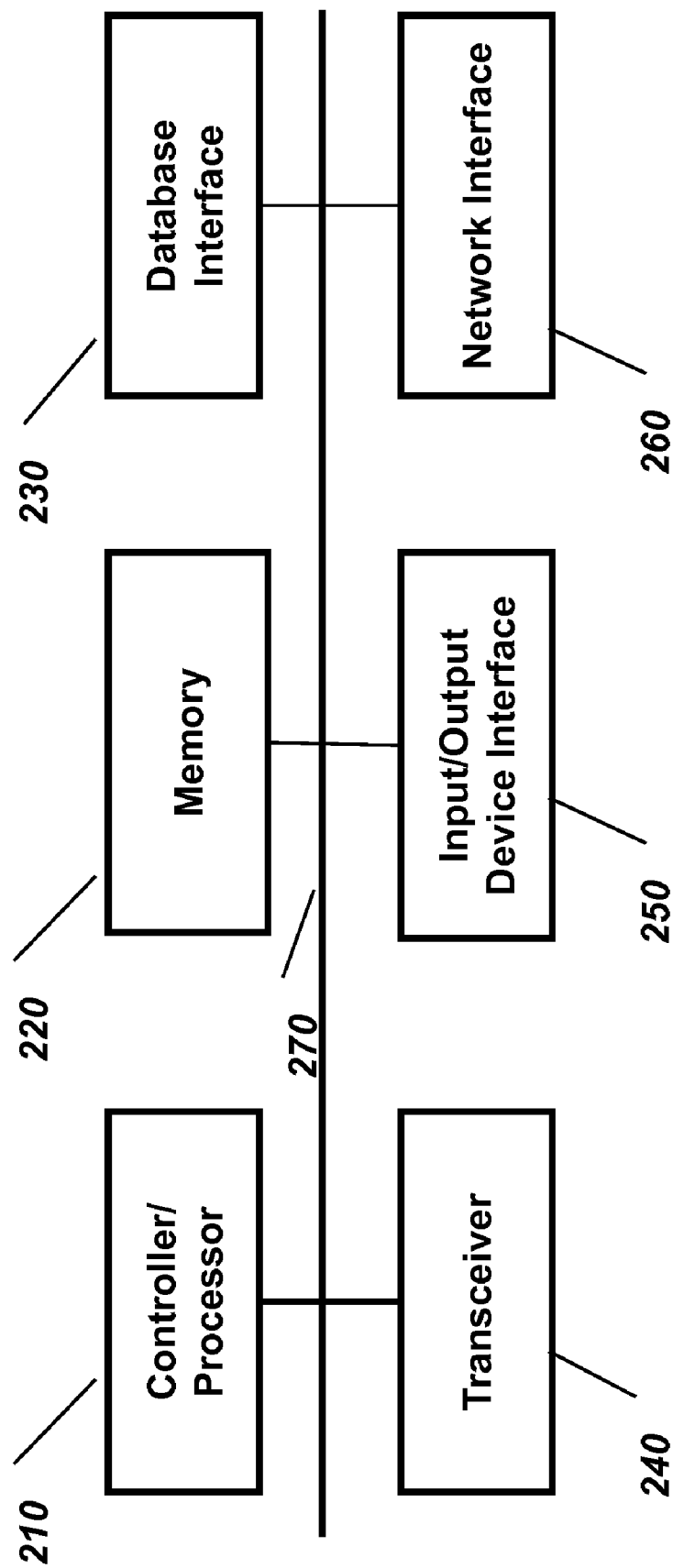
FIG. 2 illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc—read only memory (CD-ROM), digital video disc—read only memory (DVD- ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the UE 106 to the network 102.

The transceiver 240 may create a data connection with the UE 106. The transceiver may create a physical downlink control channel (PDCCH) and a physical uplink control channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
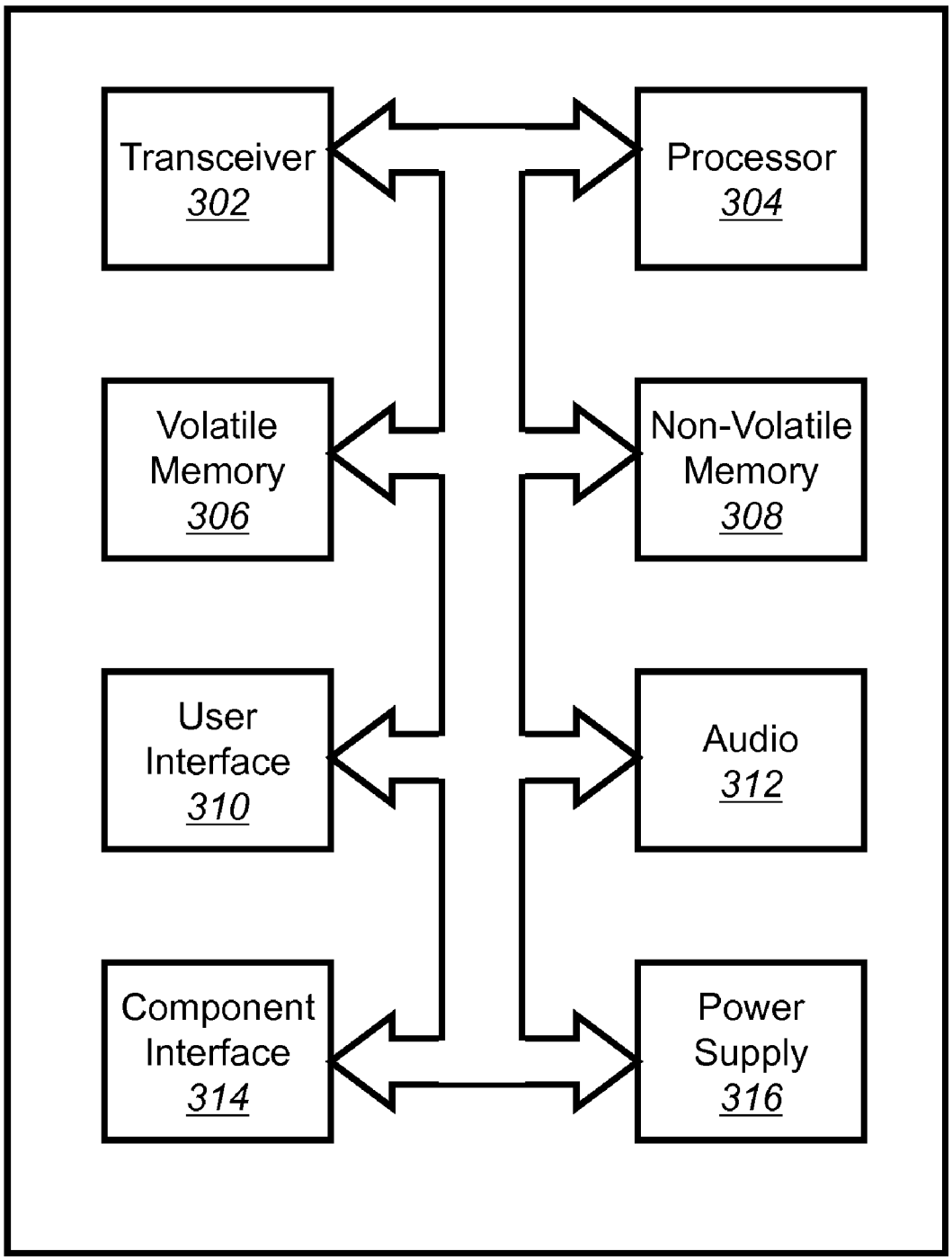
FIG. 3 illustrates in a block diagram one embodiment of the user equipment.

FIG. 3 illustrates in a block diagram one embodiment of a telecommunication apparatus or electronic device to act as the UE 106. The UE 106 may be capable of accessing the information or data stored in the network 102. For some embodiments of the present invention, the UE 106 may also support one or more applications for performing various communications with the network 102. The UE 106 may be a handheld device, such as, a mobile phone, a laptop, or a personal digital assistant (PDA). For some embodiments of the present invention, the UE 106 may be WiFi® capable device, which may be used to access the network 102 for data or by voice using VOIP.

The UE 106 may include a transceiver 302, which is capable of sending and receiving data over the network 102. The UE 106 may include a processor 304 that executes stored programs. The UE 106 may also include a volatile memory 306 and a non-volatile memory 308 which are used by the processor 304. The UE 106 may include a user input interface 310 that may comprise elements such as a keypad, display, touch screen, and the like. The UE 106 may also include a user output device that may comprise a display screen and an audio interface 312 that may comprise elements such as a microphone, earphone, and speaker. The UE 106 also may include a component interface 314 to which additional elements may be attached, for example, a universal serial bus (USB) interface. Finally, the UE 106 may include a power supply 316.

A UE 106 may determine whether a radio link is in synchronization or out of synchronization with a base station by assuming the transmission of a control channel type with a specific format, subcarrier mapping, transmit antenna configuration, and power boost. The transmission format may correspond to a particular error correcting code type, such as convolutional code, block code, turbo-code; payload size; code rate; block size; modulation type; or other error correcting code type. The control channel type need not be physically transmitted in the signal, and no actual decoding followed by cyclical redundancy check (CRC) may be necessary to detect whether the radio link is out-of-synchronization/in-synchronization. The UE 106 may make the detection by using an estimate of the channel state for a portion of the subframe which contains the control channel, such as propagation channel coefficients, interference variance, and others. The channel state information may be estimated from cell-specific reference signals or by other methods. The channel state may be defined in generic terms as the realization of the propagation channel between the transmitter and the receiver together with noise and interfering signals over the time-frequency region of signal reception. As one example, channel state may refer to the collection of the per-subcarrier channel coefficients and the per-subcarrier interference plus noise variance statistics. As another example, channel state information may refer to the per-subcarrier signal to interference and noise ratio (SINR).

The UE 106 may estimate the block error rate (BLER) of a radio link to determine if the link is usable, in failure, or in recovery. The SINR of the reference signal computed over the entire time-frequency resources in the control region may be used as an input to a channel state function describing channel state information. The channel state information function may map all subband signal to noise ratio (SNR) and channel quality information (CQI) type metrics. The channel state information function may approximate reference signal SINR computed over those resource element groups corresponding to the physical downlink control channel (PDCCH) codeword. The channel state information function may be a cascaded set of functions. In one embodiment, a first sub-function may take the received signal as an input to calculate an estimate of the channel state, such as a channel coefficient estimated per subcarrier and the interference and noise variance per subcarrier. A second sub-function may take the channel state estimate and map that to the BLER estimate.

Different UE receiver implementations may have different PDCCH demodulator or decoder capabilities. The BLER mappings for a UE 106 may be adjusted to more accurately reflect the actual implementation. Alternately, a UE 106 may use pre-specified functions to obtain an "effective SINR" metric and for comparison against thresholds to identify an out-of-synchronization or in-synchronization event. A UE 106 may form mean mutual information per bit (MMIB) estimates or channel capacity estimates instead of BLER to determine whether the link can support reliable transmissions of PDCCH.

The channel state information or BLER estimate may be obtained from each subframe sampled from the processing window in continuous reception mode. For a discontinuous reception mode of operation, these subframes may correspond to the subframes, or a subset thereof, at the paging occasions successively separated by a discontinuous cycle period. The processing windows may correspond to multiple discontinuous reception period durations from which the subframes are sampled.

The UE 106 may use the aggregated per-subband channel state information for the PDCCH codeword to obtain the BLER estimate. Since, the actual time-frequency diversity experienced by the PDCCH codeword in the propagation channel generates the BLER estimate, the estimate of BLER may be more accurate. On the other hand, if the UE 106 uses a single reference signal SINR level, compared against thresholds, for determination of the synchronization events, the wideband nature of the PDCCH codeword mapping and the associated gains due to frequency diversity for higher bandwidths, such as greater than 1.4 MHz, may not be captured. A synchronization event may be an event in which the synchronization status of the radio link changes. This practice may lead to increased false triggers of out-of-synchronization events when the narrowband reference signal SINR is low, such as when signal over the measurement bandwidth is in fade, while the PDCCH codeword would have been decodable.

Figure 4:
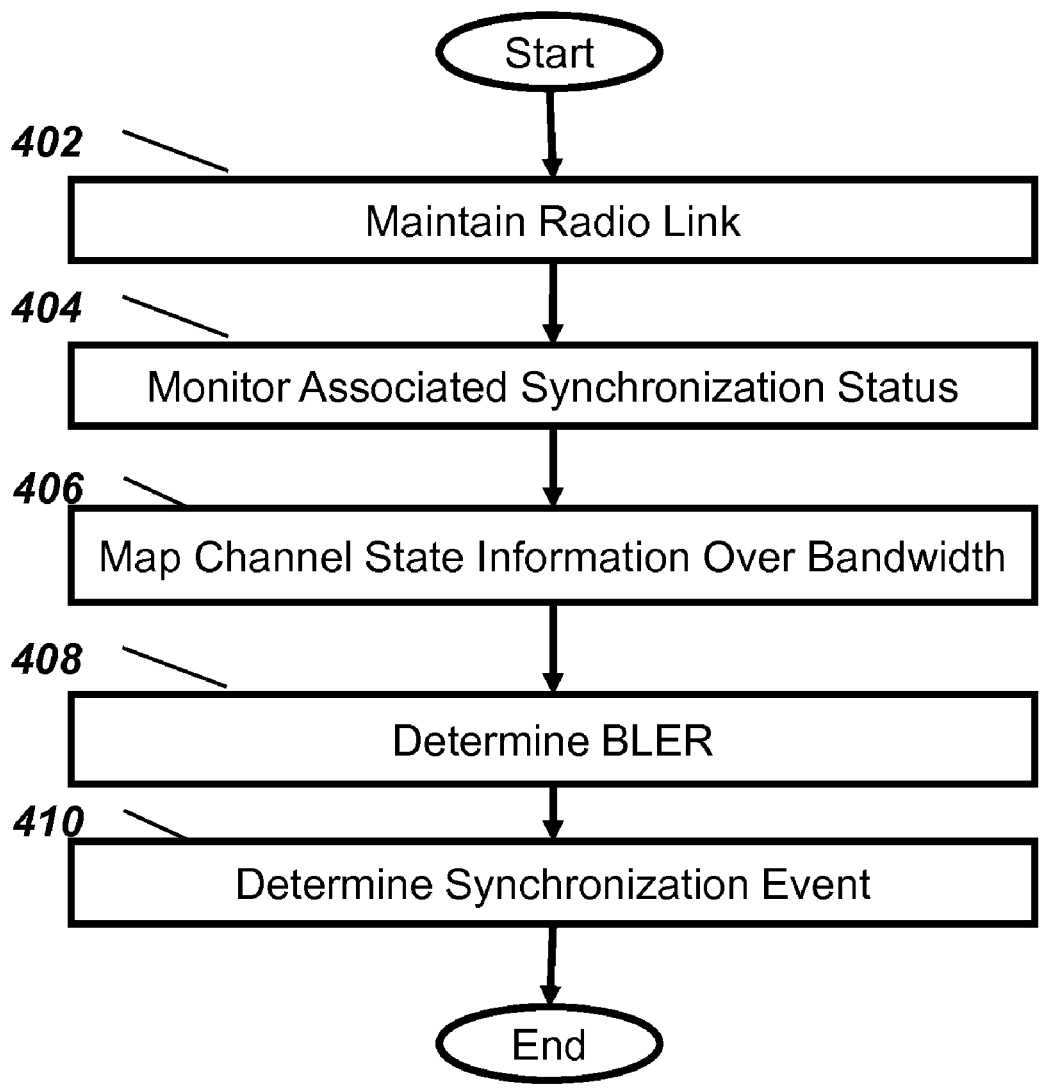
FIG. 4 illustrates, in a flowchart, one embodiment of a method of determining a synchronization event.

FIG. 4 illustrates, in a flowchart, one embodiment of a method 400 of determining a synchronization event. The UE 106 may maintain a radio link with a base station (Block 402). The UE 106 may monitor the synchronization status associated with the radio link (Block 404). The UE 106 may map channel state information to a synchronization status of the radio link based on the received signal over a specified bandwidth (Block 406). The UE 106 may determine the synchronization status via the BLER estimate in the radio link based on the channel state information (Block 408). The UE 106 may determine the synchronization event based upon the BLER (Block 410).

The UE 106 may use different formats to determine when an out-of-synchronization event has occurred versus when an in-synchronization event has occurred. A first threshold, herein referred to as a failure threshold, may signify at which point a BLER becomes high enough to indicate that a radio link has become out of synchronization. A second threshold, herein referred to as a recovery threshold, may signify at which point a BLER becomes low enough to indicate that a radio link has become in synchronization. Both levels may be determined as a function of bandwidth, such as 1.4, 3, 5, 10, 15, 20 MHz, and transmit antenna configuration, such as 1×2, 2×2 space frequency block coding (SFBC) or 4×2 SFBC-frequency switching transmission diversity (FSTD). Alternately, the UE 106 may use just two levels, one for out-of-synchronization and one for in-synchronization, common across bandwidths and transmit antenna configuration.

An out-of-synchronization event may occur when the SNR drops or the channel quality deteriorates such that the control or shared channels become undecodable. The threshold may be determined by considering the best coverage available when the maximum error protection, maximum power boosting and maximum frequency-time diversity transmission are deployed.

The UE 106 may use reference signal symbols to obtain a per-subband channel state information for the control region of a subframe. A subband may be one control channel element (CCE), resource element group, or some other aggregation of subcarriers that contain the mapped symbols of the PDCCH codeword. A PDCCH payload may have a specific format, such as Format 1A. The format may have a specific minimum payload size, such as 31 bits for 10 MHz; a specific maximum aggregation level applicable to the bandwidth, such as an aggregation level of 8 for 10 MHz bandwidth; and a specific codeword-to-subcarrier mapping that achieves the maximum time-frequency diversity. Alternately, the UE 106 may use a typical payload size, typical aggregation level, and a typical codeword to subcarrier mapping. The UE 106 may use a maximum power boost relative to the reference signal, such as +3 dB, or a typical power boost relative to the reference signal, such as 0 dB.

The base station 104 need not actually transmit the PDCCH payload of the assumed type. The UE 106 may calculate the per-subband channel state information for the subcarrier under the assumption that PDCCH payload of the assumed type was transmitted. The UE 106 may use the per-subband channel state information for the entire PDCCH codeword for the assumed type to obtain a BLER estimate for the PDCCH codeword. The UE 106 may obtain the BLER estimate for each of the subframes in an out-of-synchronization processing interval, such as an interval of 200 ms. The UE 106 may average these estimates over the out-of-synchronization processing duration.

To generalize this mapping, the UE 106 may define channel state information that maps all the per-subband SINR or CQI-type metrics from the subframes to a single BLER estimate that is compared against a threshold for determination of the out-of-synchronization event. The UE 106 may define a criterion for out-of-synchronization detection as an event in which the average BLER estimate is greater than a set percentage over the out-of-synchronization processing duration or the BLER estimate is greater than a set percentage for the last set number of subframes.

In one example, the UE 106 may form BLER estimates for five subframes separated by 40 ms in a 200 ms processing window for the purpose of out-of-synchronization evaluation. For a subframe for which the PDCCH BLER is being estimated, the UE 106 may assume that a PDCCH Format 1A payload of ~42 bits (for 10 MHz operation) is being transmitted in the control region on the first n (0<n<4) orthogonal frequency division multiplexing (OFDM) symbols in the subframe, starting the first CCE in the common search space at an aggregation level of 8. The UE 106 may identify the time-frequency resource element groups on which the codeword gets mapped and calculates the reference signal SINR for those resource element groups. The reference signal SINR may be calculated by signal interpolation, by a minimum mean square error channel and noise estimator, or some other technique. For 72 resource element groups, the UE 106 may use 72 non-negative reference signal SINR terms in BLER estimation. The UE 106 may use the reference signal resources from the same subframe for reference signal SINR estimation for the control resource element groups, as well as current, past and future subframes. The channel state information that maps all the reference signal-SINR terms to a BLER value may be determined off-line and pre-stored in the UE 106. This function may map the 72 reference signal SINR terms to a BLER estimate value for the Format 1A PDCCH codeword. One example of channel state information may be a function that takes mean reference signal SINR and the covariance of a reference signal SINR, capturing the mean level and the time-frequency variation of the reference signal SINR, as input arguments and outputs a BLER value. The power boost value assumed for the Format 1A PDCCH payload may be subsumed into the channel state information. Alternately, the power boost may be added to the reference signal SINR terms to reflect the SINR corresponding to the resource element groups to which the PDCCH payload is mapped. The BLER estimates from the 5 subframes may then be averaged to compute an average BLER which is compared against a threshold, such as 10%, to check if the out-of-synchronization criterion is satisfied.

Out-of-synchronization determination may create a processing overhead relative to the case when the out-of-synchronization event is determined using, for example, the narrowband reference signal SINR measure. To correct for this, the UE 106 may subdivide the out-of-synchronization processing window of into two parts. The UE 106 may continuously monitor the narrowband reference signal received power (RSRP) averaged over the duration of the first part. Since the narrowband reference signal SINR measure somewhat correlates with the wideband CQI-type metric or per-subband SINR for the PDCCH resource elements, a synchronization check threshold may be used to trigger BLER estimation. For example, if the narrowband reference signal SINR drops below the synchronization threshold chosen by the implementation by averaging reference signal SINR over the first part of the processing window, the second part may use the synchronization threshold to trigger the search for an out-of-synchronization event using the BLER mapping approach.

Figure 5:
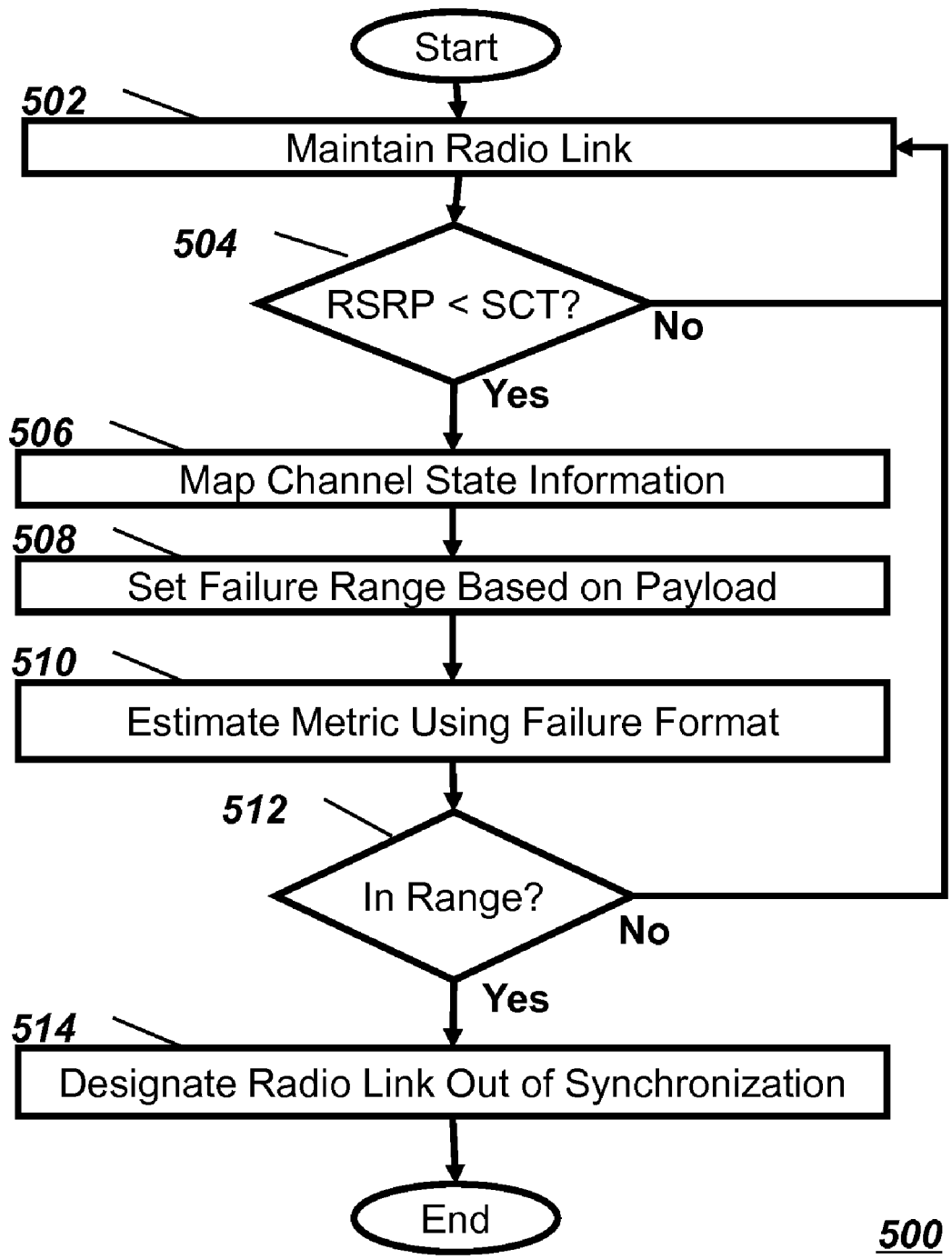
FIG. 5 illustrates, in a flowchart, one embodiment of a method of determining whether a radio link is out of synchronization.

FIG. 5 illustrates, in a flowchart, one embodiment of a method 500 of determining whether a radio link is out of synchronization. The UE 106 may maintain a radio link with a base station (Block 502). If the RSRP is less than a synchronization check threshold (Block 504), the UE 106 may map channel state information for the radio link based on the received signal over a specified bandwidth (Block 506). The UE 106 may set the failure range based upon a payload parameter, such as a control channel type (Block 508). The control channel type may be a specific transmission format, sub-carrier mapping, transmit antenna configuration, power boost, or other parameters. The transmission format may be an error correcting code type, payload size, code rate, block size, modulation type, or other formats. The error correcting code type may be a convolution code, block code, turbo-code, or other codes. The UE 106 may estimate a metric for the radio link based on the channel state information using a format best suited for determining if the radio link failure is about to occur, or failure format (Block 510). The metric may be a block error rate, a mean mutual information per bit, average signal to noise ratio, channel capacity, or other metric. If the metric is within the failure range (Block 512), the UE 106 may designate the radio link as having an out of synchronization event (Block 514).

The UE 106 may use a different format for determining an in-synchronization event, with less overhead. The UE 106 may use reference signal symbols to obtain a per-subband channel state information for the control region of a subframe. A subband may be one control channel element (CCE), resource element group, or some other aggregation of subcarriers that contain the mapped symbols of the PDCCH codeword. A PDCCH payload may have a specific format, such as Format 1A or 1C. The format may have a specific maximum payload size, such as 31 bits for 10 MHz; a specific minimum aggregation level applicable to the bandwidth, such as an aggregation level of 2; and a specific codeword-to-subcarrier mapping that achieves the minimum time-frequency diversity. Alternately, the UE 106 may use a typical payload size, typical aggregation level, and a typical codeword to subcarrier mapping. The UE 106 may use a minimum power boost relative to the reference signal, such as −6 dB, or a typical power boost relative to the reference signal, such as 0 dB.

The base station 104 need not actually transmit the PDCCH payload of the assumed type. The UE 106 may calculate the per-subband channel state information for the subcarrier under the assumption that PDCCH payload of the assumed type was transmitted. The UE 106 may use the per-subband channel state information for the entire PDCCH codeword for the assumed type to obtain a BLER estimate for the PDCCH codeword. The UE 106 may obtain the BLER estimate for each of the subframes in an in-synchronization processing interval, such as an interval of 100 ms. The UE 106 may average these estimates over the in-synchronization processing duration.

To generalize this mapping, the UE 106 may define channel state information that maps all the per-subband SINR or channel state information-type metrics from the subframes to a single BLER estimate that is compared against a threshold for determination of the in-synchronization event. The UE 106 may define a criterion for in-synchronization detection as an event in which the average BLER estimate is less than a set percentage over the in-synchronization processing duration or the BLER estimate is less than a set percentage for the last set number of subframes.

For in-synchronization evaluation, the UE 106 may use Format 1C, as the system information block (SIB), paging channel (PCH) and random access channel (RACH) response messages are addressed by this PDCCH format. After the UE 106 goes to in-synchronization state, the UE 106 may attempt cell reselection and send a RACH message on the uplink. The signal conditions may be such that the RACH response and the SIB transmissions are decodable by the UE 106. Further, a Format 1C codeword may have lower error protection, minimum power boost, and subcarrier mapping that achieves minimum frequency-time diversity resulting in the limiting behavior. Alternately, the UE 106 may use any other typical control channel format aimed at characterizing the typical behavior.

In one example, the UE 106 may form BLER estimates for five subframes separated by 20 ms in a 100 ms processing window for the purpose of in-synchronization evaluation. For a subframe for which the PDCCH BLER is being estimated, the UE 106 may assume that a PDCCH Format 1C payload of ~31 bits (for 10 MHz operation) is being transmitted in the control region on the first three OFDM symbols in the subframe, starting the first CCE in the common search space at an aggregation level of 2. The UE 106 may identify the time-frequency resource element groups on which the codeword gets mapped and calculate the reference signal SINR for those resource element groups. The UE 106 may use channel state information to determine the BLER for that subframe.

Figure 6:
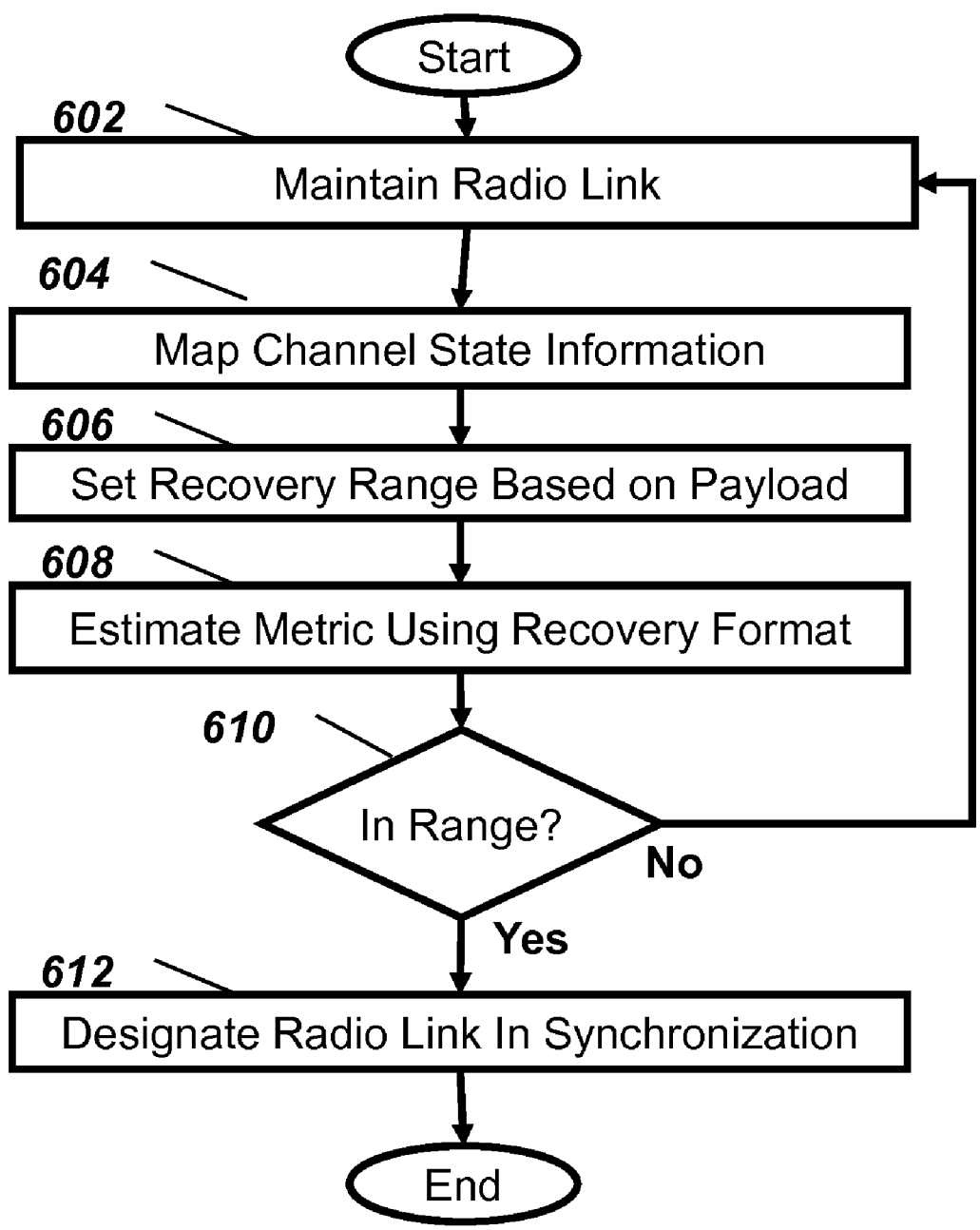
FIG. 6 illustrates, in a flowchart, one embodiment of a method of determining whether a radio link is in synchronization.

FIG. 6 illustrates, in a flowchart, one embodiment of a method 600 of determining whether a radio link is in-synchronization. The UE 106 may maintain a radio link with a base station (Block 602). The UE 106 may map channel state information function for the radio link based on the subcarrier over a specified bandwidth (Block 604). The UE 106 may set the recovery range based upon a payload parameter, such as control channel type (Block 606). The control channel type may be a specific transmission format, sub-carrier mapping, transmit antenna configuration, power boost, or other parameters. The transmission format may be an error correcting code type, payload size, code rate, block size, modulation type, or other formats. The error correcting code type may be a convolution code, block code, turbo-code, or other codes. The UE 106 may estimate the metric for the radio link based on the channel state information using a format best suited for determining if the radio link recovery is about to occur, or recovery format (Block 608). The metric may be a block error rate, a mean mutual information per bit, average signal to noise ratio, channel capacity, or other metric. If the metric is within the recovery range (Block 610), the UE 106 may designate the radio link as having an in synchronization event (Block 612).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for detecting a status of a radio link, comprising:
   receiving a reference signal transmitted from a base station;
   monitoring a synchronization status associated with the radio link;
   assuming a transmission of a codeword of a first payload type from the base station;
   estimating a block error rate applicable to the assumed codeword of the first payload type based on the reference signal; and
   determining the synchronization status from the estimated block error rate.

2. The method of claim 1, further comprising:
   determining a channel state information from the reference signal; and
   estimating the block error rate estimate applicable to the assumed codeword of the first payload type based on the channel state information.

3. The method of claim 2, further comprising:
   estimating from the channel state information a metric of at least one of a block error rate, a mean mutual information per bit, average signal to noise ratio, or channel capacity using a failure format; and
   determining if the radio link has an out of synchronization event if the metric is within a failure range.

4. The method of claim 3, further comprising:
   setting the failure range based upon at least one payload parameter.

5. The method of claim 4, wherein the payload parameter is at least one of a specific transmission format, sub-carrier mapping, transmit antenna configuration, aggregation level, or power boost.

6. The method of claim 5, wherein the payload corresponds to a physical downlink control channel format 1A.

7. The method of claim 5, wherein the specific transmission format is one of a downlink control information 1A and a downlink control information 1C.

8. The method of claim 3, further comprising:
   determining the out of synchronization event for the radio link if a signal strength is below a synchronization check threshold.

9. The method of claim 2, further comprising:
   estimating, from the channel state information, a metric of at least one of a block error rate, a mean mutual information per bit, average signal to noise ratio, or channel capacity using a recovery format; and
   determining if the radio link has an in synchronization event if the metric is within a recovery range.

10. The method of claim 9, further comprising:
    setting the recovery range based upon at least one payload parameter.

11. The method of claim 10, wherein the payload parameter is at least one of a specific transmission format, sub-carrier mapping, transmit antenna configuration, aggregation level, or power boost.

12. The method of claim 11, wherein the payload corresponds to a physical downlink control channel format 1C.

13. The method of claim 2, further comprising:
    estimating, from the channel state information, an average block error rate over an out of synchronization processing duration; and
    determining if the radio link has an out of synchronization event if the average block error rate exceeds a failure threshold.

14. The method of claim 2, further comprising:
estimating from the channel state information an average block error rate over an in-synchronization processing duration; and
determining if the radio link has an in synchronization event if the average block error rate is below a recovery threshold.

15. The method of claim 2, wherein the channel state information is a function of the underlying propagation channel.

16. The method of claim 1, further comprising:
mapping the channel state information over a specified bandwidth.

17. The method of claim 1, wherein the reference signal corresponds to a cell-specific reference signal.

18. The method of claim 1, wherein the block error rate applicable to the assumed codeword of the first payload type is assumed regardless of whether a codeword of the first payload type is actually transmitted by the base station.

19. The method of claim 1, wherein estimating the block error rate applicable to the assumed codeword of the first payload type based on the reference signal further comprises estimating the block error rate without decoding the assumed codeword.

20. The method of claim 1 wherein, the first payload type is at least one of a control channel element size, a resource element group size, a size of subcarriers aggregated, a payload size, a subcarrier mapping, a power boost relative to the reference signal, a specific transmission format, a transmit antenna configuration, and a control region size.

21. A telecommunications apparatus for detecting a status of a radio link, comprising:
a transceiver that receives a reference signal transmitted from a base station; and
a processor that monitors a synchronization status associated with the radio link, assumes a transmission of a codeword of a first payload type from the base station, estimates a block error rate applicable to the assumed codeword of the first payload type based on the reference signal and determines the synchronization status from the estimated block error rate.

22. The telecommunications apparatus of claim 21 wherein the processor determines a channel state information from the reference signal and estimates from the channel state information a metric of at least one of a block error rate, a mean mutual information per bit, average signal to noise ratio, or channel capacity using a failure format and determines if the radio link has an out of synchronization event if the metric is within a failure range.

23. The telecommunications apparatus of claim 22, wherein the processor sets the failure range based upon at least one payload parameter.

24. The telecommunications apparatus of claim 22, wherein the processor determines the out of synchronization event for the radio link if a signal strength is below a synchronization check threshold.

25. The telecommunications apparatus of claim 22, wherein the processor estimates from the channel state information a metric of at least one of a block error rate, a mean mutual information per bit, average signal to noise ratio, or channel capacity using a recovery format and determines if the radio link has an in synchronization event if the metric is within a recovery range.

26. The telecommunications apparatus of claim 25, wherein the processor sets the recovery range based upon at least one payload parameter.

27. The telecommunications apparatus of claim 22, wherein the processor maps the channel state information over a specified bandwidth.

* * * * *